United States Patent [19]

Miyakawa

[11] Patent Number: 4,888,457

[45] Date of Patent: Dec. 19, 1989

[54] SWITCH FOR DETECTING ERRONEOUS ERASE PROTECTION FIN OF TAPE CASSETTE

[75] Inventor: Minekazu Miyakawa, Tomioka, Japan

[73] Assignee: Iizuka Electric Industry Co., Ltd., Tokyo, Japan

[21] Appl. No.: 210,008

[22] Filed: Jun. 22, 1988

[30] Foreign Application Priority Data

Jun. 23, 1987 [JP] Japan ............................ 62-96431[U]

[51] Int. Cl.⁴ ........................ H01H 1/14; G11B 15/04
[52] U.S. Cl. ........................................ 200/283; 360/60
[58] Field of Search ............... 200/283, 330, 535, 553; 360/60, 137

[56] References Cited

U.S. PATENT DOCUMENTS

| Re. 29,158 | 3/1977 | Cartier et al. | 200/283 |
| 3,677,556 | 7/1972 | Oosone | 360/60 |
| 3,979,770 | 9/1976 | Wild | 360/60 |
| 4,679,101 | 7/1987 | Tezuka | 360/60 |

FOREIGN PATENT DOCUMENTS 0185270  8/1987  Japan ..................... 360/60

Primary Examiner—Henry J. Recla
Assistant Examiner—Glenn T. Barrett
Attorney, Agent, or Firm—Koda & Androlia

[57] ABSTRACT

A switch for detecting an erroneous erase protection fin provided on a side wall of a video tape cassette including a stationary contact strip made of electrically conductive metal, a movable contact strip made of electrically conductive metal, and a main body formed by an integral molding of electrically insurating synthetic resin. The main body includes a base portion for supporting the stationary and movable contact strips such that they are aligned in a direction in which they are resiliently deformable, a first actuation portion which is engaged with the stationary and movable contact strips, a first flexible portion provided between the base portion and the first actuation portion, a second actuation portion which is engaged with the movable contact portion, and a second flexible portion which is provided between the base portion and the second actuation portion. When the cassette has the fin, the first and second actuation portions are pushed and the stationary and movable contact strips are placed in contact with each other, but when the fin has been removed from the cassette, the second actuation portion is not pushed and the movable contact strip is separated from the stationary contact strip.

6 Claims, 3 Drawing Sheets

4,888,457

SWITCH FOR DETECTING ERRONEOUS ERASE PROTECTION FIN OF TAPE CASSETTE

BACKGROUND OF THE INVENTION

Field of the Invention and Related Art Statement

The present invention relates to a switch for detecting an erroneous erase protection fin provided on a tape casette such as a video tape cassette and an audio tape cassette.

FIG. 1 is a schematic cross sectional view illustrating the construction of a switch for detecting the existence of the erroneous erase protection fin of tape cassette. The switch comprises a stationary contact strip 1, a movable contact strip 2, both made of a resilient metal, and a main body 3 made of electrically insulating synthetic resin. The switch further includes a first actuation member 4 which is secured to the main body 3 rotatably about a shaft 5, and a second actuation member 7 secured to a free end of movable contact strip 2. The second actuation member 7 is arranged within a space 6 formed in the first actuation member 4. It should be noted that the second actuation member 7 has a substantially triangular cross section and its apex portion is projected beyond the first actuation member 4. A reference numeral 8 denotes a stopper for restricting the rotation of the first and second actuation members 4 and 7 in the clockwise direction, and a reference numeral 9 represents a stopper for preventing the counter-clockwise rotation of the second actuation member 7.

As shown in FIG. 1, the known switch is consisting of the five parts, i.e. stationary contact strip 1, movable contact strip 2, main body 3, first actuation member 4 and second actuation member 7. Therefore, the cost for preparing the parts is liable to be increased and the number of assembling steps becomes large. Further, the force of restitution of the switch is generated only by the resilient force of metal strips 1 and 2, so that the strips are liable to be fatigued and the durability of the switch is short.

SUMMARY OF THE INVENTION

The present invention has for its object to provide a novel and useful switch for detecting the erroneous erase protection fin of tape cassette, which can be manufactured simply from a smaller number of parts and the force of restitution can be generated not only by the resiliency of the contact strips, but also by the resiliency of synthetic resin material forming the main body.

According to the invention, a switch for detecting an erroneous erase protection fin provided on a tape cassette comprises a stationary contact strip made of electrically conductive metal, a movable contact strip made of electrically conductive metal, said movable contact strip being aligned with said stationary contact strip viewed in a direction in which they are deformable, and a main body made of electrically insulating material and having a base portion for supporting said stationary and movable contact strips, a first actuation portion which is engaged with the stationary and a tip of the movable contact strips, a first flexible portion provided between the base portion and the first actuation portion, a second actuation portion which is engaged with the movable contact strip, and a second flexible portion provided between the second actuation portion and the base portion, whereby when the cassette has the fin, the first and second actuation portions are moved to place the stationary and movable contact strips into contact with each other, but when the cassette does not have the fin, the second actuation portion is not pushed by the fin so that the movable contact strip is separated from the stationary contact strip.

DESCRIPTION OF THE PREFERRED EMBODIMENTS

Figure 1:
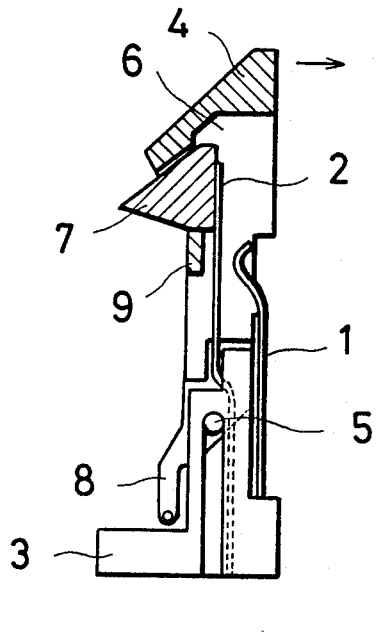
FIG. 1 is a cross sectional view showing the construction of the known erroneous erase protection fin detecting switch.
Figure 2:
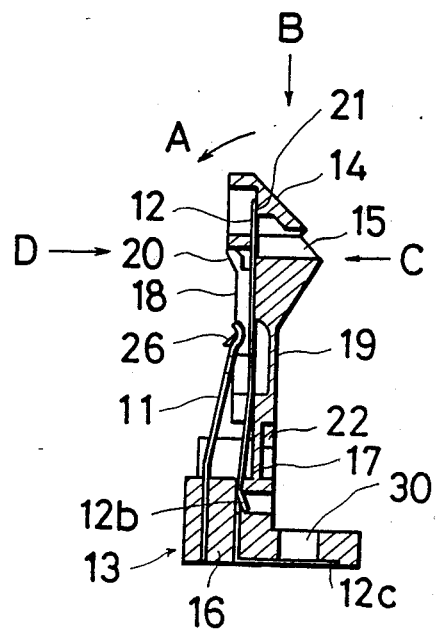
FIG. 2 is a cross sectional view illustration the construction of an embodiment of the erroneous erase protection fin detecting switch according to the invention.

FIG. 2 is a cross sectional view showing the construction of an embodiment of the switch according to the invention. The switch is mainly consisting of three parts, i.e. a stationary contact strip 11, a movable contact strip 12 and a main body 13 made of electrically insulating synthetic resin material, said stationary and movable contact strips being made of electrically conductive metal. According to the invention, a first actuation member 14 for actuating both the stationary and movable contact strips 11 and 12 and a second actuation member 15 for driving only the movable contact strip 12 are formed integrally with the main body 13.

Figure 3:
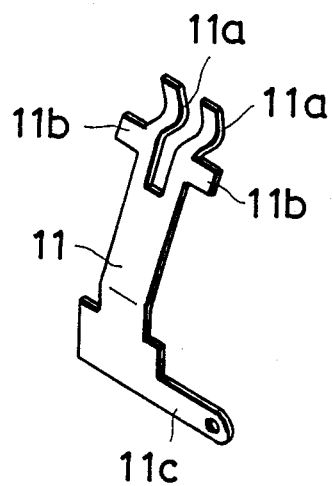
FIGS. 3 and 4 are perspective views depicting the stationary and movable contact strips of the switch shown in FIG. 2.

FIG. 3 is a perspective view illustrating the construction of the stationary contact strip 11. The stationary contact strip 11 comprises a pair of contact portions 11a, a pair of arm portions 11b formed at a free end portion thereof and a terminal portion 11c formed at a root portion thereof. The contact portions 11a are curved such that they project toward the movable contact strip 12.

Figure 4:
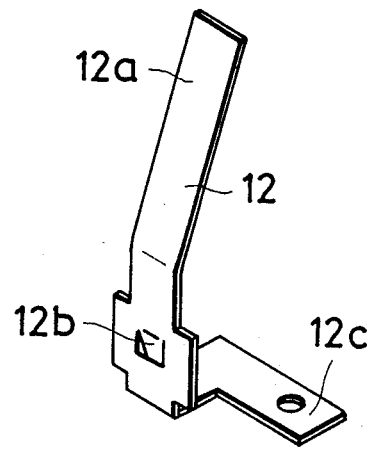

FIG. 4 is a perspective view depicting the detailed construction of the movable contact strip 12. The movable contact strip 12 has a contact portion 12a, a lag portion 12b and a terminal portion 12c. When the movable contact 12 is assembled in the main body 13, the lag portion 12b is projected into a hole formed in the main body as shown in FIG. 2, so that the movable contact strip is prevented from being removed out of the main body. Further, the terminal portion 12c is brought into contact with the bottom surface of main body 13.

Figure 5:
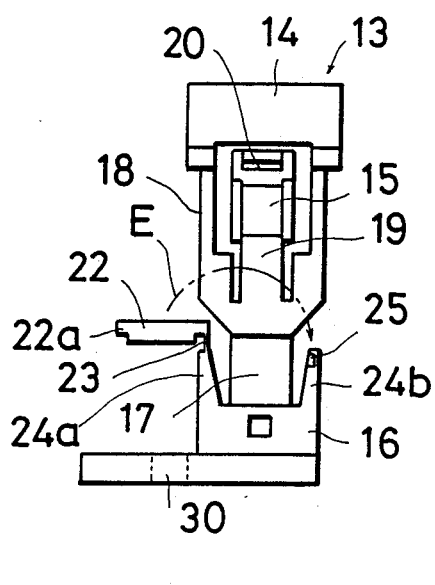
FIGS. 5, 6, 7, 8 and 9 are front, rear, side, plan and bottom views, respectively showing the main body.
Figure 6:
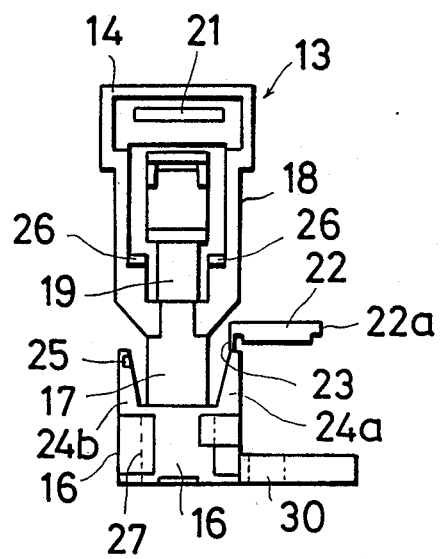
Figure 7:
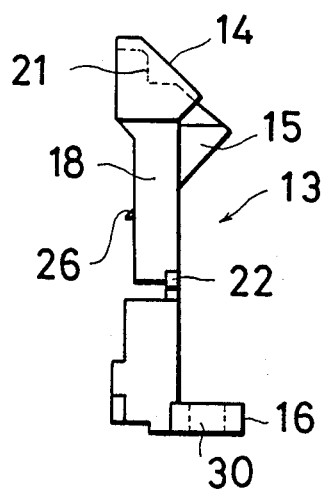
Figure 8:
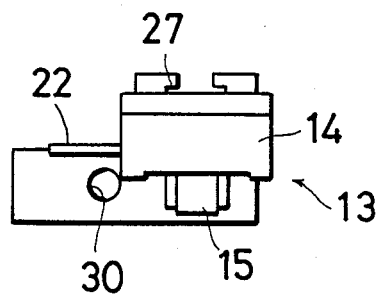
Figure 9:
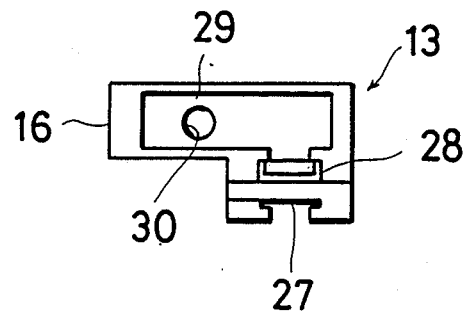

FIGS. 5 to 9 show the detailed construction of the main body 13 of the switch and FIGS. 5 and 6 are front and rear views, respectively viewed from directions C and D in FIG. 2 FIG. 7 is a side view and FIGS. 8 and 9 are plan and bottom views of the main body. The main body 13 includes a base portion 16 and a frame portion 18 which are coupled with each other by means of a first flexible portion 17. At an upper part of the frame portion 18 there is integrally formed a first actuation portion 14. On an inner surface of the frame portion 18 there is integrally formed a second actuation portion 15 by means of a second flexible portion 19. In the second actuation portion 15 there is formed an opening 20 through which the movable contact strip 12 is passed. On an inner surface of the first actuation portion 14 there is formed a flat portion 21 against which the free end of movable contact strip 12 is resiliently urged.

The first and second flexible portions 17 and 19 are formed in the thin plate which can be resiliently bent so that they can produce the force of restitution. In order to prevent the first and second actuation portions 14 and 15 from being rotated in the clockwise direction in FIG. 2, a stopper portion 22 is integrally formed with the main body 13 by means of a hinge portion 23 which is shaped in the formed of a thin strip. The hinge portion 23 is formed at a tip of a first side wall portion 24a.

Upon assembling, the movable contact strip 12 is inserted into a recess 28 formed in the base portion 16 of the main body 13 and then the stationary contact strip 11 is inserted into a recess 27 formed in the base portion 16. After that, the stopper 22 is rotated by 180° in the direction shown by an arrow E in FIG. 5 until a tip 22a of the stopper is engaged with a recess 25 formed in a top of a second wall portion 24b. In this manner, the switch can be assembled very simply.

In order to prevent the first actuation portion 14 from being rotated excessively in the direction shown by an arrow A in FIG. 2, there is formed a pair of projections 26 integrally with the frame portion 18, said projections is engaged with the arm portions 11b of the stationary contact strip 11. In FIGS. 8 and 9, there are shown the recess 27 into which the stationary contact strip 11 is to be inserted, and the recess 28 into which the movable contact strip 12 is to be inserted. In FIGS. 8 and 9, a reference numeral 29 denotes a recess into which the terminal portion 12c of movable contact strip 12 is clamped, and a reference numeral 30 represents a hole through which a screw for fixing the switch to an electric device using the tape cassette is passed.

When the first actuating portion 14 is pushed in the direction A in FIG. 2, the movable contact strip 12 is pushed by the flat portion 21 of the first actuation portion, and at the same time the second actuation portion 15 is also moved. In this condition, the force of restitution is generated by the first and second flexible portions 17 and 19 in addition to the stationary and movable contact strips 11 and 12. When the second actuation portion 15 is pushed in the direction C in FIG. 2, only the movable contact strip 12 is moved so that these contact strips 11 and 12 are remained in contact with each other and the force of restitution is produced not only by the movable contact strip 12 but also by the second flexible portion 19.

The switch is secured to a video deck at a video tape cassette installing portion with the aid of the hole 30. When the video tape cassette is inserted in the direction shown by an arrow B in FIG. 2, the first and second actuation portions 14 and 15 are engaged with the cassette and both the contact strips 11 and 12 are pushed in the direction A. When the cassette has the erroneous erase protection fin left unbroken, the second actuation portion 15 is urged against the fin and the movable contact strip 12 is pushed in the direction A and thus the switch is remained on. When the cassette has no erroneous erase protection fin, the apex portion of the second actuation portion 15 protrudes into a recess formed in the wall of cassette, so that the switch is made off. This will be further explained with reference to FIGS. 10(a) and 10(b).

Figure 10:
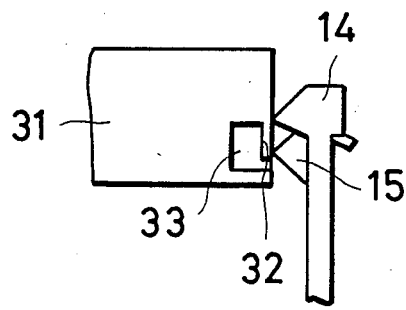
FIGS. 10(a) and 10(b) are schematic side views illustrating the operation of the switch.
Figure 10:
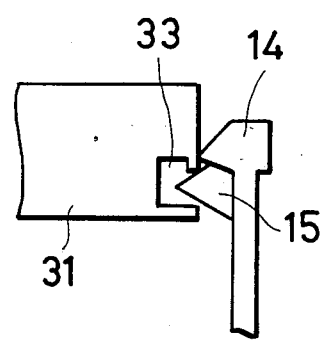

When the erroneous erase protection fin 32 is remained in the cassette 31 as illustrated in FIG. 10(a), the second actuation portion 15 is pushed rightward by the fin, and therefore the movable contact strip 12 is also pushed and the contact portion 12a of movable contact strip 12 is urged against the contact portions 11a of stationary contact strip 11. In this manner the switch is driven into the ON condition, and the video deck recognizes that the cassette can be erased, if desired. Contrary to this, when the fin 32 is broken off as shown in FIG. 10(b), the second actuation portion 15 is projected into the space 33 formed in the cassette 31 upon the insertion of the cassette into the video deck, the switch is changed in the OFF condition and the video deck recognizes that the cassette could not be erased and the electronic circuit in the video deck is driven into such a condition that the recording could not be effected.

As explained above, the switch for detecting the erroneous erase protection fin according to the present invention can be constructed from a smaller number of parts because the first and second actuation portions are integrally formed with the main body. Further the switch according to the invention can be assembled very simply and thus the cost of the switch can be reduced materially. Moreover, the force of restitution is generated not only by the contact strips made of metal plate, but also by the flexible portions integrally formed with the main body, so that the large force of restitution can be obtained and the fatigue of the switch is reduced. Therefore, the switch according to the invention can be used for a very long time in a reliable manner.

What is claimed is:

1. A switch for detecting an erroneous erase protection fin provided on a tape cassette comprising
   a stationary contact strip made of electrically conductive metal,
   a movable contact strip made of electrically conductive metal, said movable contact strip being aligned with said stationary contact strip when viewed in a direction in which said movable contact strip is deformable, and
   a main body made of electrically insulating material and having a base portion for supporting said stationary and movable contact strips, a first actuation portion which is engaged with the stationary contact strip and a tip of the movable contact strip, a first flexible portion provided between the base portion and the first actuation portion, a second actuation portion which is engaged with the movable contact strip, and a second flexible portion provided between the second actuation portion and the base portion said base, first and second actuation portions and said first and second flexible portions being integrally formed; whereby when the cassette has the fin, the first and second actuation portions are moved to place the stationary and movable contact strips into contact with each other, but when the cassette does not have the fin, the second actuation portion is not pushed by the fin so that the movable contact strip is separated from the stationary contact strip.

2. A switch according to claim 1, wherein said first actuation portion is formed in a frame portion which is connected to the base portion by means of said first flexible portion and said second actuation portion is connected to said frame portion by means of said second flexible portion.

3. A switch according to claim 2, wherein said second actuation portion has a hole formed therein and said movable contact strip is extended through said hole such that a free end of the movable contact strip is engaged with a flat portion of the first actuation portion.

4. A switch according to claim 2, wherein said stationary contact strip has arm portions which are engaged with a stopper formed in the frame portion.

5. A switch according to claim 2, wherein said main body further comprises a stopper portion which prevents the rotation of the stationary and movable contact strips in a direction opposite to said direction in which said movable contact strip is deformable.

6. A switch according to claim 5, wherein said stopper portion is connected to said frame portion via a flexible portion formed integrally with the main body.

* * * * *